US 6,616,872 B2

(12) United States Patent
Kamiguchi et al.

(10) Patent No.: US 6,616,872 B2
(45) Date of Patent: Sep. 9, 2003

(54) METHOD OF AND APPARATUS FOR DETERMINING SEPARATING FORCE OF MOLDED PRODUCT FROM MOLD (75) Inventors: Masao Kamiguchi, Yamanashi (JP); Tatsuhiro Uchiyama, Gotenba (JP); Hiroshi Watanabe, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 09/985,773

(22) Filed: Nov. 6, 2001

(65) Prior Publication Data

US 2002/0056933 A1 May 16, 2002

(30) Foreign Application Priority Data

Nov. 10, 2000 (JP) ........................................ 2000/343141

(51) Int. Cl.$^7$ .............................................. B29C 45/76
(52) U.S. Cl. ...................... 264/40.1; 264/334; 425/139; 425/165; 425/556
(58) Field of Search ................................ 264/40.1, 334; 425/139, 165, 444, 556

(56) References Cited

U.S. PATENT DOCUMENTS

| 4,981,634 | A | * | 1/1991 | Maus et al. | ................. | 264/102 |
| 5,639,486 | A | * | 6/1997 | Yamaguchi | ................. | 425/139 |
| 5,736,079 | A | * | 4/1998 | Kamiguchi et al. | ......... | 264/40.1 |
| 6,322,733 | B1 | * | 11/2001 | Herbst | ....................... | 264/40.5 |
| 6,398,536 | B2 | * | 6/2002 | Onishi | ........................ | 425/136 |

FOREIGN PATENT DOCUMENTS

| JP | 56146713 | 11/1981 |
| JP | 60-190829 | 9/1985 |
| JP | 61182916 | 8/1986 |
| JP | 01071722 | 3/1989 |
| JP | 01244816 | 9/1989 |
| JP | 10-119107 | 5/1998 |
| JP | 10-156837 | 6/1998 |
| JP | 11-083657 | 3/1999 |
| JP | 2000108183 | 4/2000 |

OTHER PUBLICATIONS

Rosato, Dominick, Donald Rosato, and Marlene Rosato. Injection Molding Handbook. 3rd edition. 2000. Kluwer Academic Publishers. pp. 296–298.*

* cited by examiner

*Primary Examiner*—Jill L. Heitbrink
*Assistant Examiner*—Monica A Fontaine
(74) *Attorney, Agent, or Firm*—Staas & Halsey LLP (57) ABSTRACT A method of and an apparatus for precisely determining a separating force of a molded product from a mold by an ejector in an injection molding machine. A load exerted on an ejector mechanism in operation without a product molded in the mold is constituted by an inner resistance of the ejector mechanism. The inner resistance includes frictional force produced within the ejector mechanism and resilient forces of springs for returning ejector pins to retracted positions thereof. On the other hand, the load exerted on the ejector mechanism in operation with a product molded in the mold is constituted by the inner resistance and the separating force of the molded product from the mold. Thus, a difference between the loads detected in driving the ejector mechanism with and without a molded product at each ejector position precisely represents the separating force of the molded product from the mold. Judgment on defectiveness/non-defectiveness of the molded product, and abnormality of the injection molding operation and the ejector mechanism are performed more precisely based on the determined separating force of the molded product.

16 Claims, 7 Drawing Sheets

METHOD OF AND APPARATUS FOR DETERMINING SEPARATING FORCE OF MOLDED PRODUCT FROM MOLD

BACKGROUND OF THE INVENTION

1. Field of the Invention

The present invention relates to an ejector for ejecting a molded product from a mold in an injection molding machine, and in particular to a method of and an apparatus for determining a separating force for separating the molded product from the mold by the ejector.

2. Description of the Related Art

There have been proposed several methods of determining a separating force for separating a molded product from a mold, and detecting status of the molded product and/or the mold and further errors in various settings of the ejector mechanism based on the determined separating force. For example, it is known from Japanese Patent Laid-Open Publication No. Heisei 10-119107 to detect a load exerted on ejector pins for preventing breakage of the ejector pins and/or a core of the mold by an abnormal load thereon by an interference of the ejector pins and the core because of an error of setting of projection amount of the ejector pin, and for detecting remaining of the molded product in the molds.

As means for detecting the separating force, it is generally known to measure the load exerted on the ejector mechanism directly using a sensor and by estimation of the load using a disturbance estimating observer incorporated in a controller of a servomotor for driving the ejector mechanism.

Japanese Patent Laid-Open Publication No. Showa 56-146713 describes a method of determining a separating force of a molded product as a difference between peak values of respective loads exerted on an ejector rod in driving an ejector mechanism with and without a molded product in the mold, which are detected by a strain sensor mounted on the ejector rod. In this method, the separating force is determined by subtracting the peak value of the load exerted on the ejector rod without a molded product in the mold, which is constituted by a resistance force in the mold, from the peak value of the load exerted on the ejector rod with a molded product in the mold, which is constituted by a sum of the inner resistance force and the separating force for separating the molded product from the mold. However, time at which the inner resistance force reaches its peak value is generally different from time at which the separating force excluding the inner resistance force reaches its peak value, and therefore the difference of the peak values of the loads with and without a molded product in the mold does not precisely represent the separating force. For example, in the case where the inner resistance force reaches the peak value at the end of the ejector motion and the separating force reaches the peak value at the beginning of the motion, the difference obtained by subtracting the peak value of the load without a molded product (detected at the end of the ejector motion) from the peak value of the load with a molded product does not represent the peak value of the separating force because the resistance force included in the peak value with a molded product is not subtracted from the peak value of the ejecting force with the molded product, to cause a problem of failing in precise determination of the separating force.

Further, in the above method of determining the separating force using a sensor mounted on the ejector pin, the sensor has to be incorporated in the mold to have a complex structure and raise a manufacturing cost, and also causing a problem of reliability of the sensor in mass production.

Japanese Patent Laid-Open Publication No. Showa 61-182920 describes a method of determining the separating force indirectly by measuring a time period of operation of the ejector mechanism, since the time period of ejecting a molded product form a mold varies in dependence on a resistance of the molded product in separating from the mold since adherence of the molded product on the mold differs in dependence on a filling pressure of resin material into a cavity of the mold. In this the method, in order to detect variation of the separating force, it is necessary to lower a driving force of the ejector to make the ejecting time vary with variation of the separating force, to render it difficult to establish a precise relationship between the measured time and the ejecting force, i.e., failing in performing stable ejection of a molded product or in precisely determining the separating force.

In the above-mentioned Japanese Patent Laid-Open Publication No. Heisei 10-119107, the disturbance load torque is estimated by a disturbance estimating observer incorporated in a servo controller for controlling a servomotor for driving the ejector mechanism, and an abnormal signal informing a collision of the ejector rod with an obstacle is issued when the estimated disturbance load torque continuously exceeds an allowable range for a predetermined time period. In this method, the estimated disturbance load torque includes frictions of movable components moving in the mold and an elastic force of return springs for returning an ejector plate in the mold, and therefore the separating force in separating the molded product from the mold is not detected with high precision.

SUMMARY OF THE INVENTION

The method of determining a separating force of a molded product from a mold in an injection molding machine of the present invention comprises the steps of driving an ejector mechanism in a molding operation without injection of resin not to produce a molded product in the mold, and obtaining and storing a load exerted on the ejector mechanism at every predetermined period or every predetermined position of the ejector mechanism in driving the ejector mechanism; driving an ejector mechanism in a molding operation with injection of resin to produce a molded product in the mold, and obtaining a load exerted on the ejector mechanism at every predetermined period or every predetermined position in driving the ejector mechanism; and obtaining a difference between the load obtained and stored in driving the ejector mechanism without molded product and the load obtained in driving the ejector mechanism with the molded product in the mold as a separating force of the molded product at every predetermined period or every predetermined position of the ejector mechanism.

The separating force may be obtained in a predetermined range in a motion stroke of the ejector mechanism.

The loads exerted on the ejector mechanism may be detected by means of a specific sensor or in the case where the ejector mechanism is driven by a servomotor, the loads may be obtained based on a driving force of the servomotor. In this case, the driving force of the servomotor may be obtained by means of a control program for controlling the servomotor.

Judgment on defectiveness/non-defectiveness of the molded product and abnormality of the ejector mechanism may be performed based on the determined separating force.

Further, the present invention provides an apparatus for determining a separating force of a molded product from a mold in an injection molding machine, including means for carrying out respective steps of the above method.

DETAILED DESCRIPTION OF THE PREFERRED EMBODIMENTS

Figure 1:
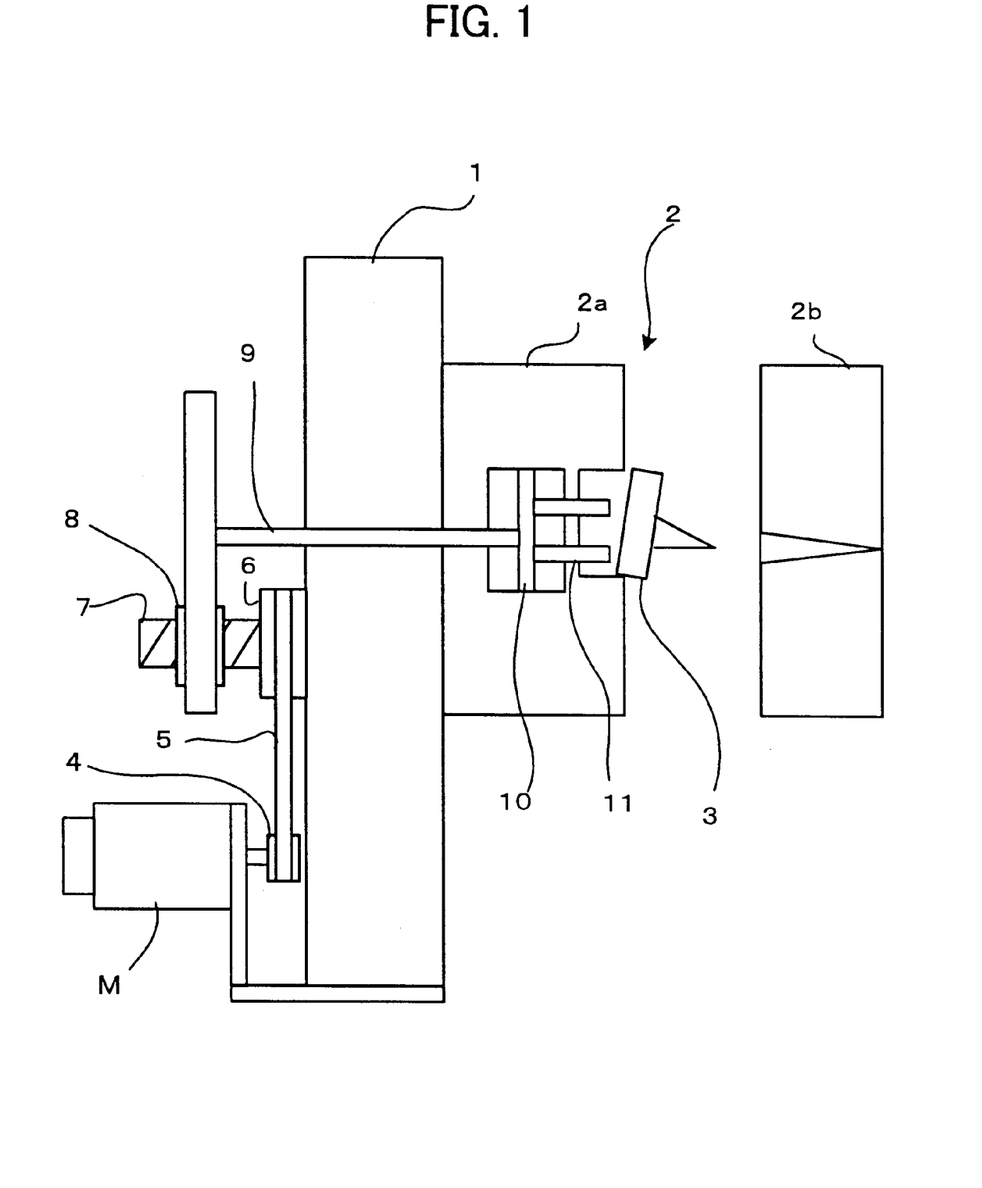
FIG. 1 is a schematic view of an electric ejector mechanism in an injection molding machine for use in the present invention.
Figure 2:
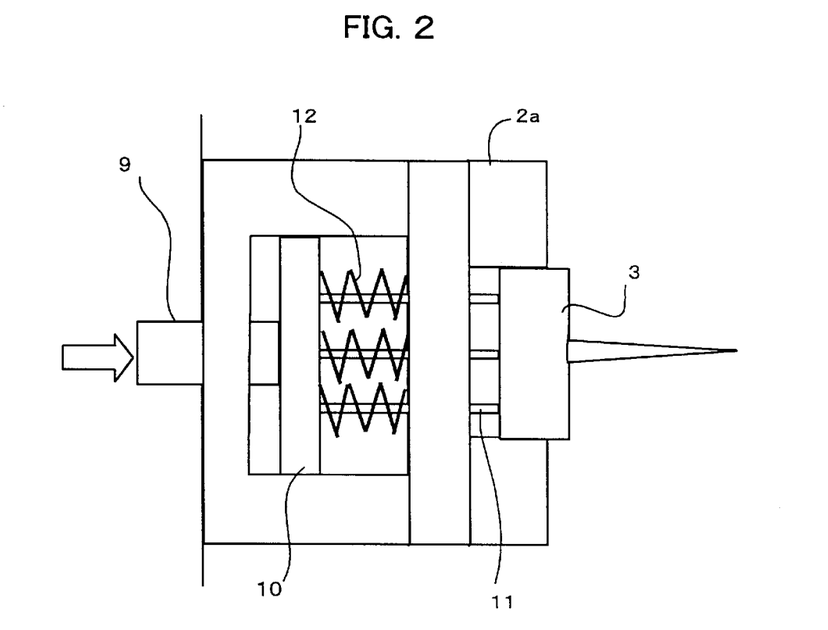
FIG. 2 is a detailed view of a part of the ejector mechanism shown in FIG. 1, the part being provided in a mold.

FIGS. 1 and 2 shows an electric ejector mechanism in an injection molding machine for use in the present invention. As shown in FIGS. 1 and 2, a movable mold half 2a of a mold 2 is mounted on a movable platen 1 of an injection molding machine and a stationary mold half 2b of the mold 2 is mounted on a stationary platen (not shown). The mold 2 is opened and closed by a sliding motion of the movable platen 1 on a base (not shown) of the injection molding machine. A servomotor M for ejection is arranged on the movable platen 1 through an appropriate fixture and an output shaft of the servomotor M is operatively connected with a ball screw 7 rotatably supported on the movable platen 1 through a pulley 4, a belt 5 and a pulley 6. The ball screw 7 is in threaded engagement with a ball nut 8 which is fixed to an ejector rod 9.

The ejector rod 9 extends through the movable platen 1 to the movable mold half 2a with a distal end abutting on an ejector plate 10. A plurality of ejector pins 11 are provided on the ejector plate 10 to be extendable into a cavity of the movable mold half 2a.

As shown in the detailed view of FIG. 2, springs 12 are arranged around the ejector pins 11 so that the ejector plate 10 and thus the ejector pins 12 are urged by elastic forces of thereof in a direction of moving remote and retracted from the cavity of the movable mold half 2a.

When the servomotor M is driven to rotate the ball screw 7 in a forwarding direction through the pulley 4, the belt 5 and the pulley 6, the ball nut 8 in engagement with the ball screw 7 moves forward (in a right-hand direction in FIG. 1) to push the ejector plate 10 to move forward against the elastic forces of the springs 12. The ejector pins 11 are projected into the cavity of the movable mold half 2a to eject a molded product 3. Then, the servomotor M is driven in the reverse direction to move the elector rod 9 backwards and thus retract the ejector plate 10 and the ejector pins 11 from the cavity of the movable mold half 2a. The above ejecting action may be performed in a plurality of times.

In the above ejecting action, a separating force for separating the molded product 3 form the movable mold half 2a is applied on the ejector mechanism including the ejector pins 11, the ejector plate 10 and the ejector rod 9. A load exerted on the servomotor M in driving the ejector mechanism with the molded product in the movable mold half 2a after opening the mold 2 with injection of resin in the mold cavity is the sum of the separating force and an inner resistance force which includes a friction caused in the elector mechanism and a force caused by a specific mechanism in the ejector mechanism such as the resilient forces of the springs 12.

On the other hand, a load exerted on the servomotor M in driving the ejector mechanism without any molded product in the movable mold half 2a after opening the molds 2a and 2b without injection of resin in the cavity of the mold 2 is constituted by the inner resistance of the ejection mechanism including the frictional resistance and the resilient force of the springs 12. Thus, a difference between the load on the servomotor M in driving the ejector mechanism with a molded product in the mold cavity and the load on the servomotor in driving the ejector mechanism without any molded product in the mold cavity represents the separating force of the molded product from the mold 2a.

Figure 3:
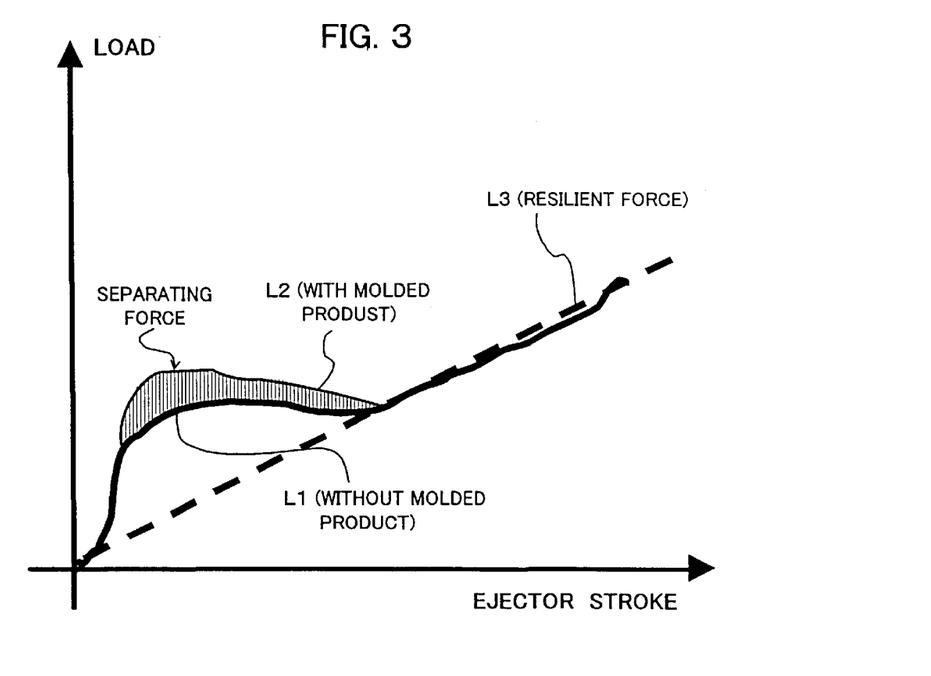
FIG. 3 is a graph showing a load exerted on a servomotor in driving the ejector mechanism as shown in FIGS. 1 and 2.

FIG. 3 shows variation of the load on the servomotor M with respect to the ejector stroke (projection stroke of the ejector pins 11).

In FIG. 3, a dotted straight line L3 indicates the resilient force of the springs 12 according to spring constant thereof, a thick line L1 indicates the load on the servomotor M in driving the ejector mechanism without molded product and a thin line L2 indicates a load on the servomotor M in driving the ejector mechanism with the molded product 3 to be ejected from the mold half 2a.

The load indicated by the thin line L2 is constituted by the separating force of the molded product 3, the frictional resistance of the ejection mechanism and the inner resistance of the mold, and the load indicated by the thick line L1 is constituted by the frictional resistance of the injection mechanism and the inner resistance of the mold. Thus, a difference between the load indicated by the thin line L2 and the load indicated by the thick line L1 precisely represents the separating force. It should be noted that a peak value of the thin line L2 does not represent a maximum value of the separating force nor a difference between the peak value of the thin line L2 and a peak value of the thick line L1 does not represent a value of the separating force. The difference between the load indicated by the thin line L2 and the load indicated by the thick line L1 at each position of the ejector pin 11 in the motion stroke does present a value of the separating force. Thus, a maximum value of the difference means the maximum value of the separating force.

According to the present invention, the above difference between the load indicated by the line L2 and the load indicated by the line L1 is obtained for determining the separating force.

Figure 4:
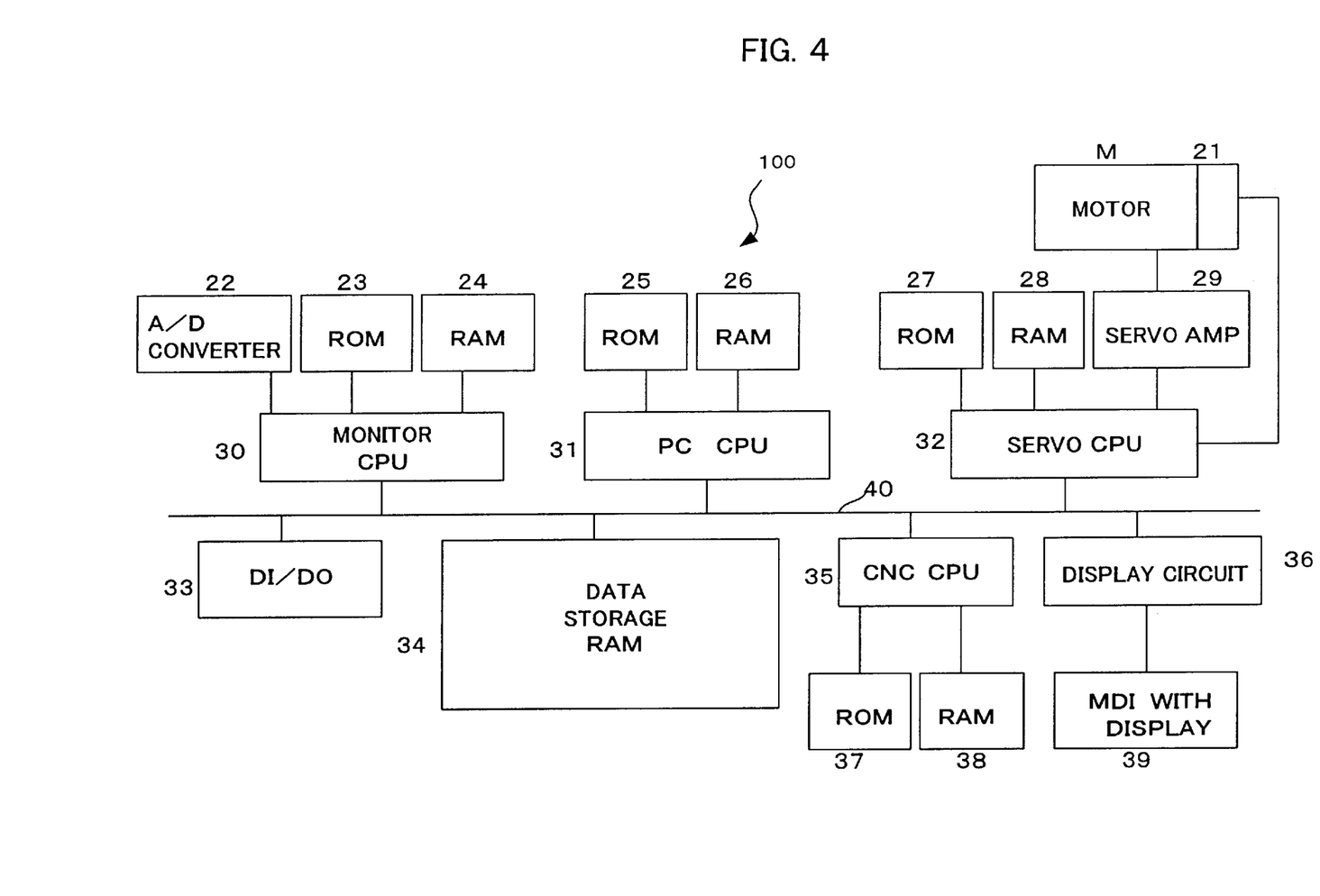
FIG. 4 is a block diagram of a controller for controlling the injection molding machine having the ejector mechanism shown in FIGS. 1 and 2.

FIG. 4 schematically shows a controller for controlling the injection molding machine adoptable in the present invention.

The controller 100 has a CNC CPU 35 as a microprocessor for a numerical control, a PC CPU 31 as a microprocessor for a programmable control, a servo CPU 32 as a microprocessor for a servo control, and a pressure monitor CPU 30 for performing a process of sampling signals from sensors for sensing various pressures such as an injection pressure. Information is transmitted among these microprocessors through a bus 40 by selecting mutual inputs/outputs.

The PMC CPU 31 is connected with a ROM 25 storing a sequence program for controlling a sequential operation of the injection molding machine and a RAM 26 for use in temporary storage of computing data, and the CNC CPU 35 is connected with a ROM 37 storing an automatic operation program for general control of the injection molding machine and a RAM 38 for use in temporary storage of computing data.

The servo CPU 32 is connected with a ROM 29 storing a control program dedicated for the servo control for performing a position loop, a velocity loop and a current loop, and a RAM 28 for use in temporary storage of computing data. The pressure monitor CPU 30 is connected with a ROM 23 storing a control program for the pressure monitor CPU 30 and a RAM 24 for storing-pressure values detected by the various sensors. Further, the servo CPU 32 is connected with a servo amplifier 29 for driving each of servomotors for each axis for mold clamping, injection, screw rotation, ejector, etc. in the injection molding machine. Output signals from a position/velocity detector 21 provided at the servomotor for each axis are fed back to the servo CPU 32. The present position of each axis is calculated by the servo CPU 32 based on the feedback signals for the position/velocity detector 21 and updated and stored in a present position storing register for each axis. The servomotor M for driving an ejector axis of the ejector mechanism and the position/velocity detector 21 for detecting position/velocity of the ejector pins based on a rotary position of the servomotor M are depicted in FIG. 1. A servo system for each axis for clamping, injection, etc. is arranged in the same manner.

An interface 33 is an input/output interface for receiving signals from limit switches arranged at respective portions on the injection molding machine and for transmitting various commands to peripheral equipments of the injection molding machine.

A manual data input (MDI) device 39 with a display device, numeral keys and various function keys is connected with a bus 40 through a display circuit 36 for displaying graphics on the display device and permitting selection of functional menus and input of various numeral data using the function and numeral keys. The display device may be a CRT display or a liquid crystal display.

A data storage RAM 34 in the form of nonvolatile memory stores molding data such as molding conditions, various set values, parameters, macro variables, etc. for an injection molding operation. Tables TA and TB are provided in the data storage RAM 34 for storing data of estimated disturbance torque values according to the present invention.

With the above described arrangement, the PMC CPU 31 controls a general sequential operation of the injection molding machine, the CNC CPU 35 distributes motion commands to the servomotors for respective axes based on the operation program stored in the ROM 37 and the molding conditions stored in the data storage RAM 34, and the servo CPU 32 performs a digital servo control including the position loop, velocity loop and current loop control based on the motion commands distributed for each axis and the position/velocity feedback signals from the position/velocity detector 21 in the ordinary manner.

The method of and apparatus for determining a separating force of a molded product of the present invention is realized by the controller 100. The hardware structure of the controller 100 for an electric injection molding machine may be the same as the conventional one of the controller for controlling an injection molding machine.

The controller 100 of the present invention differs from the conventional one in that the tables TA and TB are provided in the data storage RAM 34, for storing data of estimated disturbance torque values at every predetermined period, and a program for the disturbance torque estimating observer to be incorporated in the velocity loop of the control system, for estimating a disturbance torque exerted on the servomotor M for driving the ejector mechanism and a program for determining the separating force of the molded product and an abnormal load on the servomotor M are provided in the ROM 27 connected with the servo CPU 22.

A separating force determining processing to be executed by the servo CPU 32 in the controller 100 of the separating force determining apparatus at every predetermined period will be described referring to flowcharts of FIGS. 5 and 6.

Figure 5:
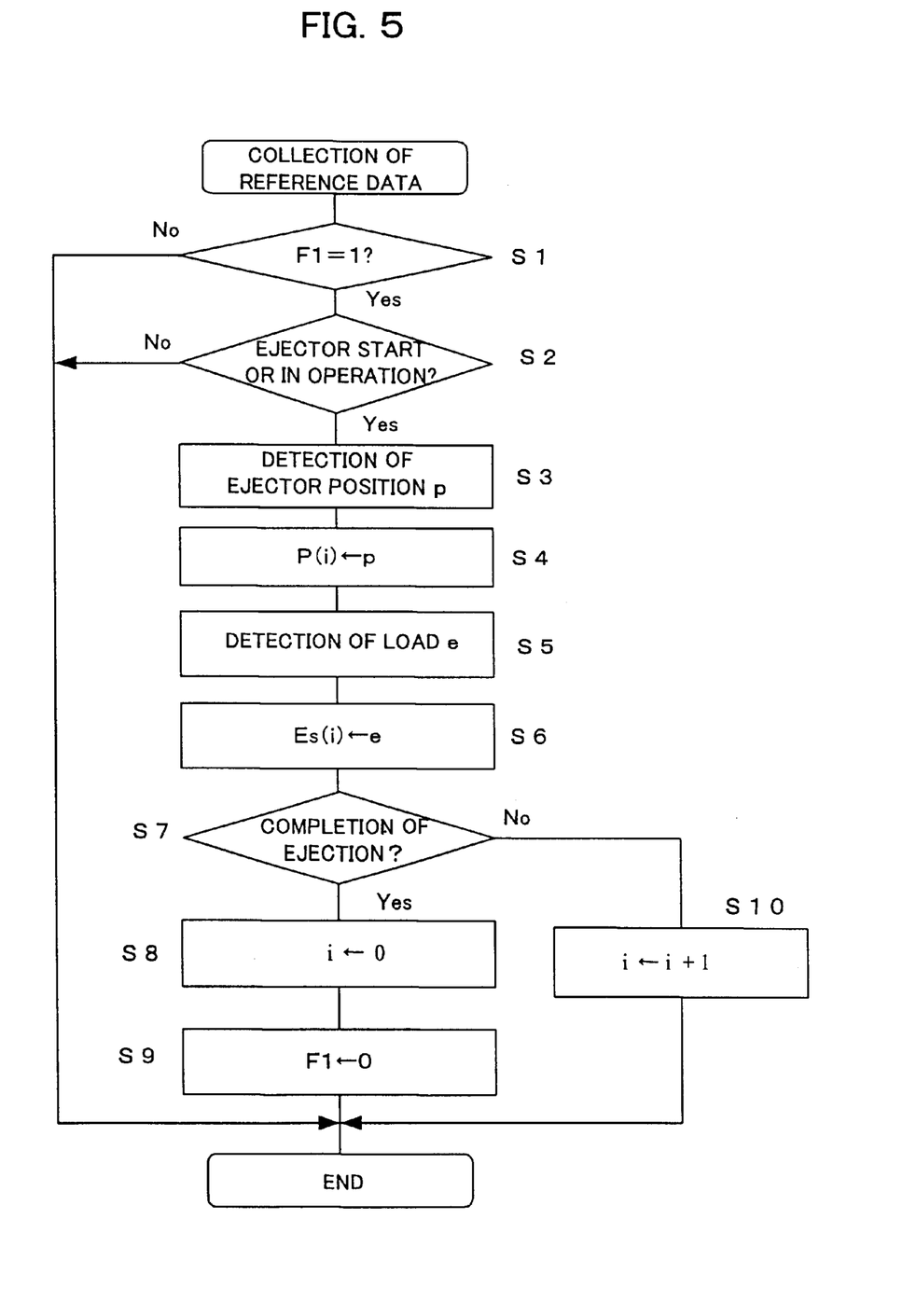
FIG. 5 is a flowchart of processing for collecting reference data in driving the ejector mechanism without a product molded in the mold.

FIG. 5 shows processing for obtaining reference data of a load exerted on the servomotor M in driving the ejector mechanism with no molded product in the mold, the load comprising an inner resistance of the ejector mechanism only.

First, a reference data collection mode is set by an operator through the manual data input device 39. The injection molding machine is operated with no injection molding action and the ejector mechanism is driven by the servomotor M with no molded product in the mold half 2a. In operation of the ejector mechanism, the load exerted on the servomotor M is estimated by the disturbance load estimating observer incorporated in the servo control system. In this embodiment, the servo control system for controlling the servomotor M is constituted by the servo CPU 32 and a software for the servo CPU 32 to perform the position, velocity and current (torque) loop control for the servomotor M.

Figure 7:
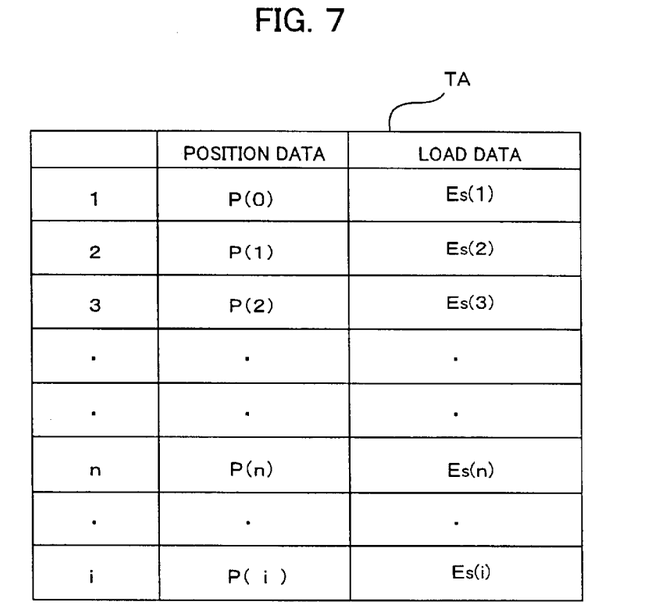
FIG. 7 is a table for storing the reference data in the reference data collecting processing.

The servo CPU 32 executes the processing shown in FIG. 5 at every predetermined processing period. First, it is determined whether or not a flag F1 indicating the reference data collection mode is "1" or not (Step S1). If the reference data collection mode is not set, the flag F1 remains as "0" and the procedure is terminated. If it is determined that the flag F1 is "1" indicating the reference data collection mode, it is determined whether or not the ejector is just started or in operation on command of the PC CPU 31 (Step S2). If it is determined that the ejector is not started nor in operation, the procedure is terminated. If it is determined that the ejector is just started or in operation, an ejector position p is detected (Step S3). The ejector position is obtained based on the position data stored in a present position storage register. The position data are obtained based on the feedback signals form the position/velocity detector 21 associated with the servomotor M or the sum of the motion commands issued for the servomotor M. The detected ejector position p is stored at an address indicated by an index "i" in a data storage region of the table TA provided in the data storage RAM 34, as shown in FIG. 7 (Step S4). The index i is initially set to "0" when the reference data collection mode is set.

Then, the load "e" exerted on the ejector mechanism is determined (Step S5). The load is determined as a value obtained by estimating a load torque on the servomotor M by the disturbance load estimating observer. The processing for estimating the load on a servomotor using the disturbance load estimating observer is well known in the art as exemplified by Japanese Patent Laid-Open Publication No. 10-119107. The determined load e is stored at an address indicated by the index i in a load storage region of the table TA as a reference load Es(i), as shown in FIG. 7 (Step S6).

In Step S7, it is determined whether or not the ejection is completed, i.e., the ejector pins are driven to a terminal end of the stroke. If the ejection is not completed, the index i is incrementally increased by "1" at Step S10 and the procedure of the present processing period is terminated.

In the subsequent processing period, since the ejector mechanism is in operation, the processing of Steps S1–S7 and S10 is repeatedly performed until the ejection is completed, to store the ejector position P(i) and the load Es(i) in the table TA.

When it is determined that the ejection is completed in Step S7, the index i and the flag F1 are set to "0" (Steps S8 and S9) and the procedure is terminated. In the subsequent processing period, since the flag F1 is set "0" the procedure immediately terminates after Step S1.

With the above processing, the table TA containing the ejector position data P(i) and the reference load data Es(i) is obtained in the data storage RAM 34, as shown in FIG. 7.

In the table TA, since the index i is incrementally increased by "1" at every predetermined processing period, the value of the index i represents an elapsed time from a start of the ejection with unit time of the predetermined processing period. Thus, the ejector position P(i) and the reference load Es(i) at respective time from the start of the ejection are stored in the table TA.

The processing for determining the separating force and detecting abnormality of the injection molding operation and the ejecting operation and further judgment on defectiveness/non-defectiveness of a molded product based on the determined separating force will be described.

Figure 9:
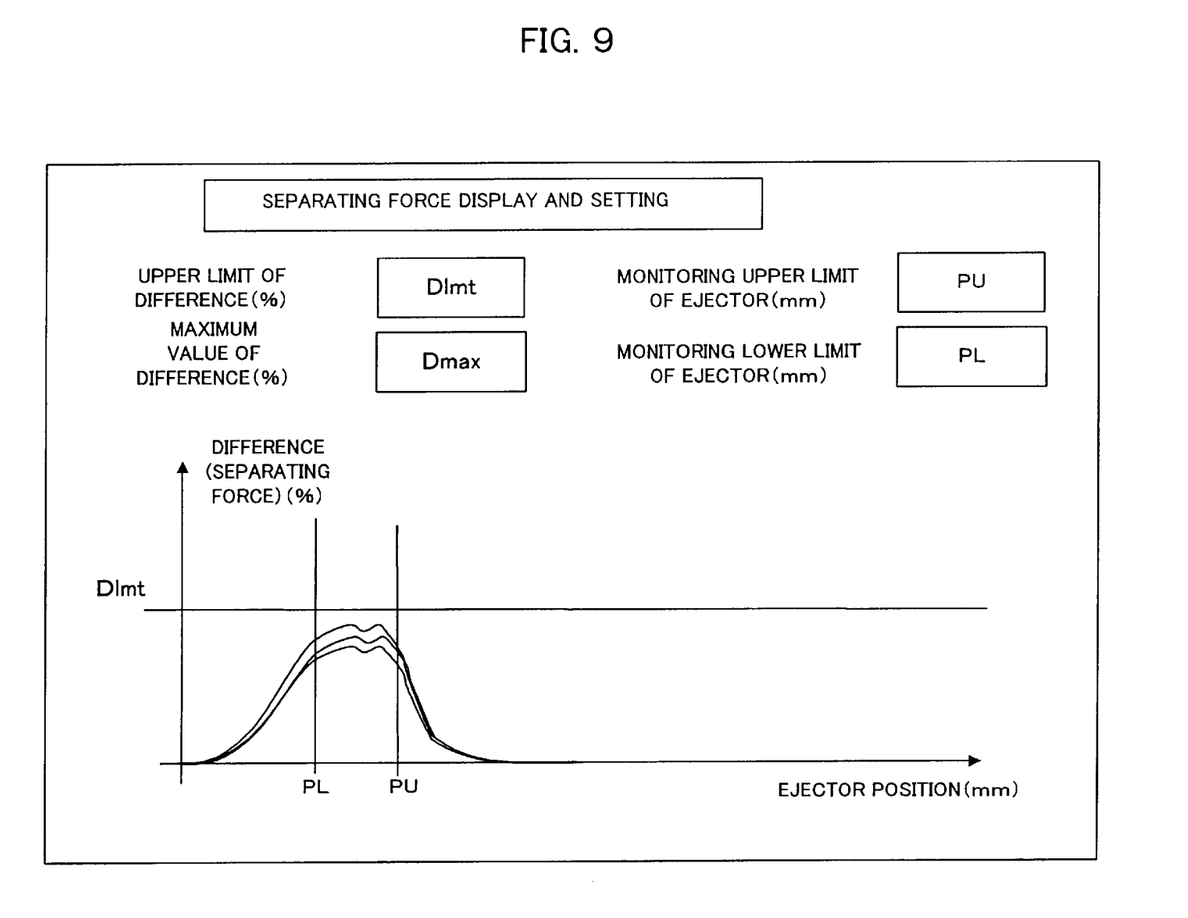
FIG. 9 shows graphics on a display device for displaying the separating force and for data setting.

First, an upper limit PU and a lower limit PL of monitoring the ejector position for judgment on the molded product are set by an operator through a graphic display on the display device of the MDI 39, as shown in FIG. 9. Further, an upper limit Dolt of the separating force (difference), as a reference value for judging defectiveness/non-defectiveness of the molded product, is set. The set values of the upper limit PU and the lower limit PL of monitoring the ejector position, and the upper limit Dlmt of the separating force are displayed on the display device in respective predetermined positions and lines representing the values are displayed in a graph showing variation of the separating force. The ways of setting the upper and lower limits PU and PL of monitoring the ejector position and the upper limit Dlmt of the separating force are described later.

Figure 6:
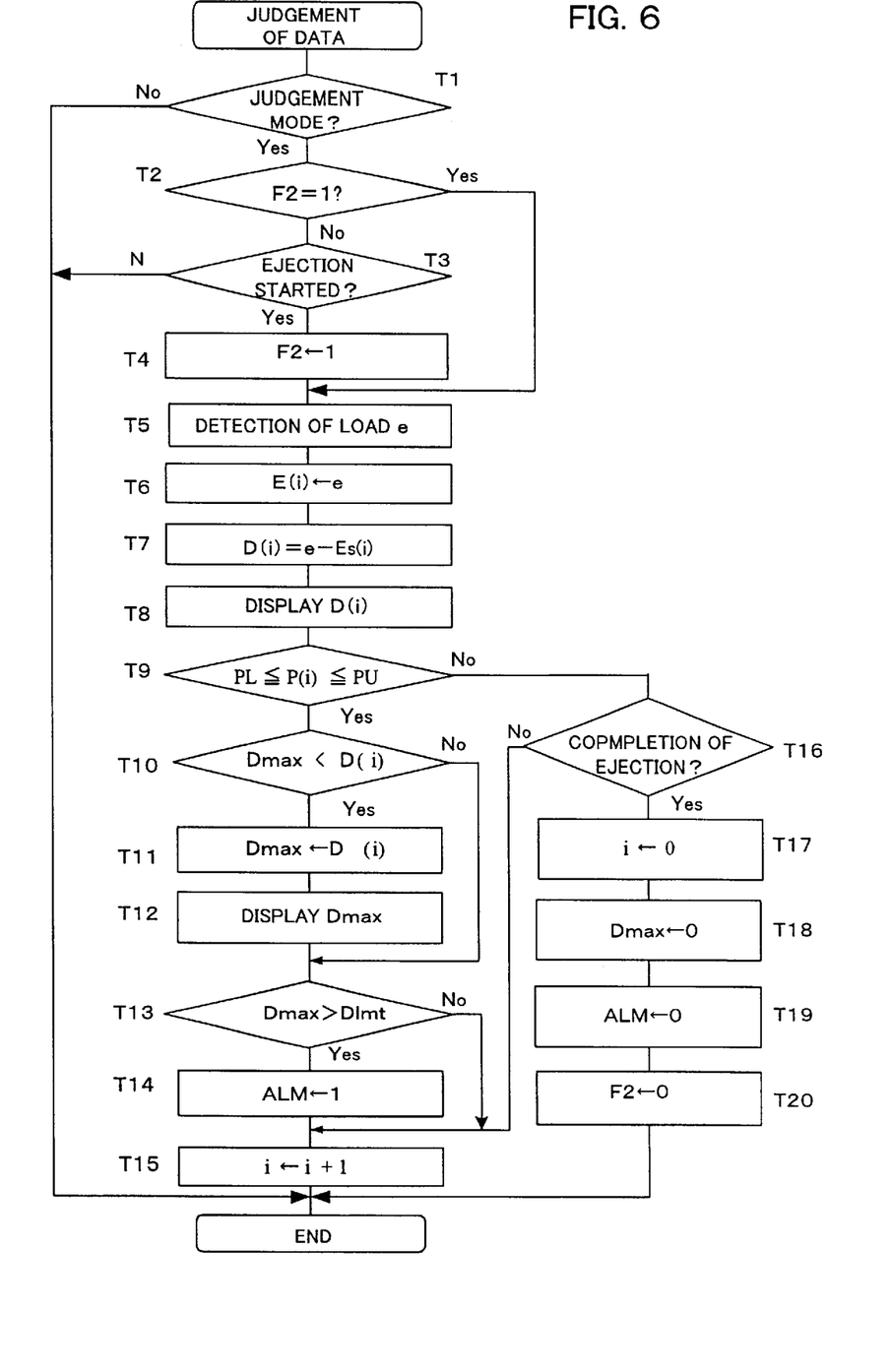
FIG. 6 is a flowchart of processing for obtaining a separating force of a molded product and performing judgment on abnormality, in driving the ejector mechanism with a product molded in the mold.
Figure 8:
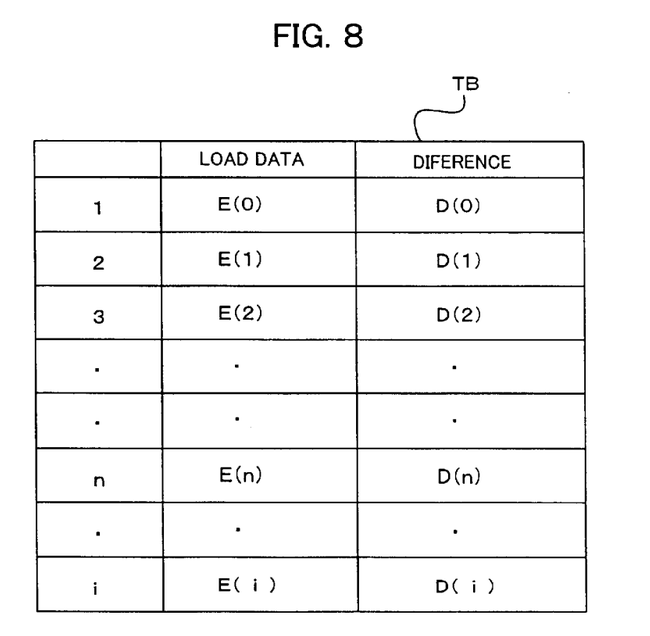
FIG. 8 is a table for storing data of load exerted on the ejector mechanism in driving the ejector mechanism with the molded product in the mold and data of difference representing the separating force of the molded product.

When a judgment mode is set and an injection molding operation is started, the servo CPU 32 executes the judgment processing shown in FIG. 6 at every predetermined processing period. It is confirmed that the injection molding operation is performed in the judgment mode (Step T1). If the judgment mode is not set, the procedure is terminated. If the judgment mode is set, it is determined whether or not the flag F2 indicating midst of collection of data is set to "1" (Step T2). If the flag F2 is not set to "1", it is determined whether or not a command for starting an ejection has been issued from the PMC CPU 31 (Step T3). If the ejection start command has not been issued from the CPU 31, the procedure is terminated. If the ejector start command has been issued, the flag F2 is set to "1" to indicate midst of data collection (Step T4), the load e estimated by the disturbance estimating observer is read (Step T5), and the read load e is stored as load E(i) at an address indicated by the index i of a load storage area in the table TB, as shown in FIG. 8 (Step T6). The index i is initially set to "0" when the power is turned on.

The reference load data Es(i) is read from the table TA at an address indicated by the index i in the position data area and is subtracted from the load e read in Step T5 to obtain a difference D(i), and the obtained difference D(i) is stored in the table TB at an address indicated by the index i in difference storage area, as shown in FIG. 8 (Step T7). Then, the obtained difference D(i) at the ejector position P(i) is displayed on the display device of the MDI 39 in the graph as shown in FIG. 9 (Step T8). The difference D(i) precisely represents the separating force of the molded product from the mold at the ejector position P(i) because the load e obtained at Step T5 represents the load exerted on the servomotor M in driving the ejector mechanism with the molded product in the mold and the load data Es(i) represents the load exerted on the servomotor M in driving the ejector mechanism without the molded product in the mold at the ejector position P(i).

Then, it is determined whether or not the ejector position P(i) is in the monitoring range between the lower limit PL and the upper limit PU (Step T9). If the ejector position is not located in the monitoring range, it is determined whether or not the ejecting action is completed (the ejector pins are moved to the most forward position of the motion stroke or not) (Step T16). If the ejecting action is not completed, the index i is incrementally increased by "1" (Step T15) and the procedure of the present processing period is terminated.

In Step T9, the ejector position P(i) is read from the table TA and it is determined whether or not the ejector position P(i) read from the table TA is within the monitoring range. Alternatively, the ejector position P(i) may be detected based on the position/velocity detector 21 in the judgment processing at every predetermined processing period and it may be determined whether or not the detected ejector position P(i) is within the monitoring range. The detected ejector position P(i) may be stored in another storage region of the table TB. The ejector position P(i) at each predetermined period from the start of the ejecting action with no molded product in the mold for obtaining the reference separating force (in the processing of FIG. 5) and the ejector position P(i) at each predetermined period from the start of the ejecting action with a molded product in the mold (in the processing of FIG. 6) are regarded as the same making no substantial difference and thus either may be used. In this embodiment, the ejector position P(i) in obtaining the reference separating force is used.

In the subsequent processing period, since the flag F2 is set to "1", the processing of Steps T1, T2, T5–T9, T16 and T15 are repeatedly executed until the ejector position P(i) enters the monitoring range. The completion of the ejecting action is not detected until the ejector position P(i) proceeds out of the monitoring range.

When it is determined that the ejector position P(i) is equal or greater than the lower limit PL and enters the monitoring range in Step T9, it is determined whether or not the difference D(i) obtained at Step T7 exceeds a maximum difference Dmax stored in a register (Step T10). This register for storing the maximum difference Dmax is initially set to "0" when the power to the controller is turned on.

If it is determined that the difference D(i) representing the separating force is greater than the maximum difference Dmax, the maximum difference Dmax is updated by storing a value of the difference D(i) in the register (Step T11). The maximum difference Dmax is displayed on the display device of the MDI 39 by numeral data, as shown in FIG. 9 (Step T12). If the difference D(i) is not greater than the maximum difference Dmax, the procedure proceeds Step T13 without performing the processing of Steps T11 and T12.

In Step 13, it is determined whether or not the maximum difference Dmax exceeds the set upper limit Dlmt of the difference. If it is determined that the maximum difference Dmax does not exceed the upper limit Dlmt, the index i is incrementally increased by "1" (Step T15) and the procedure in this processing period is terminated. If it is determined that the maximum difference Dmax exceeds the upper limit Dlmt, an abnormality signal (alarm) ALM is set to indicate abnormality of the molding operation, defectiveness of molded product or abnormality of the ejecting action (Step T14).

The processing of Steps Ti, T2, T5–T15 is repeatedly executed until the ejector position P(i) exceeds the monitoring upper limit PU at every processing period.

When it is determined that the ejector position P(i) exceeds the upper limit PU, the procedure proceeds from Step T9 to Step T16 where it is determined whether or not the ejecting action is completed. If the ejecting action is not completed, the procedure proceeds to Step T16 where the index i is incrementally increased by "1" and the procedure is terminated. Subsequently, the processing of Steps T1, T2, T5–T9, T16 and T15 is repeatedly executed until the ejecting action is completed.

When it is determined that the ejecting action is completed in Step T16, the maximum difference Dmax is reset to "0" (Step T18). Although the value of the maximum difference Dmax is reset, the displayed value on the display device of the MDI 39 is not reset to remain. Then, the abnormal signal ALM is set to "0" (Step T19) and the flag F2 is set to "0" (Step T20) and the procedure of the processing period is terminated.

In the subsequent processing periods, since the flag F2 is set to "0", the procedure proceeds from Step T1 to Steps T2 and T3 and terminates unless a new ejection start command is issued from the PMC CPU 31. When a new ejection start command is issued from the PMC CPU 31, the processing as described is started.

Thus, the difference D(i) between the load exerted on the servomotor M in driving the ejection mechanism with and without a molded product in the mold is obtained at every predetermined period from a start to an end of an ejecting action. The obtained difference D(i) is displayed as a graph on the display device of the MDI 39 and it is judged whether or not the difference D(i) exceeds the upper limit Dlmt in the set monitoring range.

The difference D(i) representing the separating force of the molded product is determined from a start to an end of an ejecting action in the above embodiment. Alternatively, the difference D(i) may be determined only in the monitoring region between the lower limit PL and the upper limit PU.

Also in the above embodiment, the ejector position P(i) at each predetermined period in the ejecting action with no molded product and the ejector position P(i) at each predetermined period in the ejecting action with a molded product are regarded to make any substantial displacement and thus it is regarded that the ejector positions in the ejecting action with and without a molded product at the time when the same time periods elapsed are the same. The difference D(i) between the load E(i) indicated by the index i and the load Es(i) at the ejector position P(i) indicated by the same index i is obtained and graphically displayed.

The above displacement is generally negligible but if the CPU has a large processing capability, the ejector position P(i) may be determined and stored at every processing period in the data judgment processing shown in FIG. 6 and the reference load at the ejector position P(i) determined in the data judgment processing may be obtained based on the reference load Es(i) in the table TA by means of interpolation/extrapolation, and a difference between the interpolated/extrapolated reference load and the load E(i) may be obtained as the separating force and displayed for the judgment of abnormality.

As described, since the ejector positions P(i) at the same time elapsed from starts of the ejecting actions in the reference data collection processing and in the data judgment processing may be regarded as the same, the difference representing the separating force may be determined on the time basis, instead of the position basis. Thus, the difference may be determined with reference to the index i indicating elapsed time from a start of the data judgment processing with unit time of the processing period. Since it is convenient to set the monitoring upper limit PU and lower limit PL on the basis of the ejector position rather than the elapsed time, the separating force is determined on the basis of the ejector position in the above embodiment.

The setting of the lower limit PL and upper limit PU of the monitoring range and the upper limit Dlmt of the separating force may be performed, for example, by setting appropriate values referring to a graph of the separating force D(i) with respect to the ejector position P(i) on the display device as shown in FIG. 9 which is displayed based on the data obtained in the data judgment processing performed with default settings.

Further, in the foregoing embodiment, the load exerted on the ejector mechanism is determined by the disturbance load estimating observer incorporated in the servo controller as a software for estimating the load exerted on the servomotor M for driving the ejector mechanism. Therefore, this arrangement is advantageous in that any additional hardware such as a sensor is not required for determining the load exerted on the ejector mechanism. As a matter of course, the load on the ejector mechanism may be directly detected using a sensor such as a strain gauge. Particularly in the case where the ejector mechanism is driven by means of hydraulic actuator other than the electric motor, the load on the ejector mechanism may be directly detected by the sensor.

Furthermore, the load exerted on the servomotor M is proportional to an output torque thereof and the output torque is proportional to a driving current thereof. Since the driving current of the servomotor M is detected by a detector for control of the servomotor M, the driving current may be utilized for determining the load on the servomotor M. In this case, it is necessary to take account of consumption of the driving current for acceleration/deceleration of the servomotor M. The influence of the consumption of the driving current is eliminated by appropriately setting the monitoring lower limit PL and upper limit PU since the driving current is consumed for acceleration/deceleration in beginning and terminating regions of the motion stroke of the ejector mechanism.

According to the present invention, the separating force of a molded product from molds is precisely determined by eliminating forces other than the separating force from the measured force. Thus, the judgment on defectiveness/non-defectiveness of a molded product, an injection molding status and abnormality of the ejector mechanism is performed more precisely.

What is claimed is:

1. A method of determining a separating force of a molded product from a mold in an injection molding machine, comprising the steps of:

driving an ejector mechanism in a molding operation without injection of resin and obtaining and storing a load exerted on the ejector mechanism at predetermined periods or predetermined positions in driving the ejector mechanism;

driving an ejector mechanism in a molding operation with injection of resin to produce a molded product in the mold, and obtaining a load exerted on the ejector mechanism at the predetermined periods or predetermined positions in driving the ejector mechanism; and obtaining a difference between the load obtained and stored in driving the ejector mechanism without the molded product and the load obtained in driving the ejector mechanism with the molded product in the mold as a separating force of the molded product at the predetermined periods or predetermined positions of the ejector mechanism.

2. A method of determining a separating force of a molded product from a mold according to claim 1, wherein the separating force is obtained in a predetermined range in a motion stroke of the ejector mechanism.

3. A method of determining a separating force of a molded product from a mold according to claim 1, wherein the loads are obtained by means of a sensor for sensing a load on the ejector mechanism.

4. A method of determining a separating force of a molded product from a mold according to claim 1, wherein the ejector mechanism is driven by a servomotor and the loads are obtained based on a driving force of the servomotor.

5. A method of determining a separating force of a molded product from a mold according to claim 4, wherein the driving force of the servomotor is obtained by means of a control program for controlling the servomotor.

6. A method of determining a separating force of a molded product from a mold according to claim 1, further comprising a step of performing judgment on defectiveness/non-defectiveness of the molded product based on the determined separating force.

7. A method of determining a separating force of a molded product from a mold according to claim 1, further comprising a step of performing judgment on abnormality of the ejector mechanism based on the determined separating force.

8. A method of determining a separating force of a molded product from a mold, comprising:

driving an ejector mechanism in a molding operation without injection of resin and determining a load exerted on the ejector mechanism at predetermined periods or predetermined positions of the ejector mechanism in driving the ejector mechanism;

driving an ejector mechanism in a molding operation with injection of resin to produce a molded product in the mold, and determining a load exerted on the ejector mechanism at the predetermined periods or predetermined positions in driving the ejector mechanism; and obtaining a difference between the load obtained and stored in driving the ejector mechanism without the molded product and the load obtained in driving the ejector mechanism with the molded product in the mold as a separating force of the molded product at the predetermined periods or predetermined positions of the ejector mechanism.

9. An apparatus to determine a separating force of a molded product from a mold in an injection molding machine having a ejection mechanism, comprising:

load determining means for determining a load exerted on the ejector mechanism at predetermined periods or predetermined positions in driving the ejector mechanism;

storing means for storing the determined load;

means for driving the ejector mechanism in a molding operation without injection of resin and storing a load exerted on the ejector mechanism determined by said load determining means in driving the ejector mechanism in said storing means; and means for driving an ejector mechanism in a molding operation with injection of resin to produce a molded product in the mold; and means for obtaining a difference between the load on the ejector mechanism determined by said load determining means in driving the ejector mechanism with the molded product and the stored load determined by said load determining means in driving the ejector mechanism without the molded product, as a separating force of the molded product at the predetermined periods or predetermined positions of the ejector mechanism.

10. An apparatus for determining a separating force of a molded product from a mold according to claim 9, further comprising means for setting a range in a motion stroke of the ejector mechanism for determining the separating force.

11. An apparatus for determining a separating force of a molded product from a mold according to claim 9, wherein said load determining means comprises a sensor provided at the ejector mechanism.

12. An apparatus for determining a separating force of a molded product from a mold according to claim 9, wherein the ejector mechanism is driven by a servomotor and said load determining means comprises a driving force detecting means for detecting a driving force of the servomotor as the load on the ejector mechanism.

13. An apparatus for detecting a separating force of a molded product from a mold according to claim 12, wherein said driving force detecting means is constituted by means of a control program for controlling the servomotor.

14. An apparatus for detecting a separating force of a molded product from a mold according to claim 9, further comprising means for performing judgment on defectiveness/non-defectiveness of the molded product based on the determined separating force.

15. A method of detecting a separating force of a molded product from a mold according to claim 9, further comprising means for performing judgment on abnormality of the ejector mechanism based on the determined separating force.

16. An apparatus to determine a separating force of a molded product from a mold using an ejection mechanism, comprising:

a load determining unit to determine a load exerted on the ejector mechanism at predetermined periods or predetermined positions in driving the ejector mechanism;

a storing unit to store the determined load; a driving unit to drive the ejector mechanism in a molding operation without injection of resin and storing a load exerted on the ejector mechanism determined by said load determining unit in driving the ejector mechanism in said storing unit and to drive the ejector mechanism in a molding operation with injection of resin to produce a molded product in the mold; and a difference determining unit to determine a difference between the load on the ejector mechanism determined by said load determining unit in driving the ejector mechanism with the molded product and the stored load determined by said load determining unit in driving the ejector mechanism without the molded product, as a separating force of the molded product at the predetermined periods or predetermined positions of the ejector mechanism.

* * * * *

UNITED STATES PATENT AND TRADEMARK OFFICE
CERTIFICATE OF CORRECTION

PATENT NO. : 6,616,872 B2  Page 1 of 1
DATED : September 9, 2003
INVENTOR(S) : Masao Kamiguchi et al.

It is certified that error appears in the above-identified patent and that said Letters Patent is hereby corrected as shown below:

<u>Column 7,</u>
Line 41, please change "Dolt" to -- Dlmt --.

<u>Column 9,</u>
Line 18, please change "Ti" to -- T1 --.
Line 25, please change "T16" to -- T15 --.

<u>Column 11,</u>
Line 63, please begin a new paragraph with -- obtaining --.

<u>Column 12,</u>
Line 63, please begin a new paragraph with -- a driving --.

Signed and Sealed this

Thirteenth Day of January, 2004

JON W. DUDAS
*Acting Director of the United States Patent and Trademark Office*